United States Patent
Tani (10) Patent No.: US 11,321,570 B2
(45) Date of Patent: May 3, 2022

(54) SYSTEM AND METHOD FOR DETERMINING EVENT

(71) Applicant: NEC CORPORATION, Tokyo (JP)

(72) Inventor: Masahiro Tani, Innovis (SG)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 16/627,886

(22) PCT Filed: Jun. 21, 2018

(86) PCT No.: PCT/JP2018/023627
§ 371 (c)(1),
(2) Date: Dec. 31, 2019

(87) PCT Pub. No.: WO2019/009089
PCT Pub. Date: Jan. 10, 2019

(65) Prior Publication Data
US 2020/0160066 A1     May 21, 2020

(30) Foreign Application Priority Data
Jul. 3, 2017    (SG) ............................ 10201705480U (51) Int. Cl.
*G06K 9/00*      (2006.01)
*H04N 7/00*      (2011.01)
(Continued)

(52) U.S. Cl.
CPC ...... *G06K 9/00771* (2013.01); *G06K 9/00711* (2013.01); *G08B 21/10* (2013.01);
(Continued)

(58) Field of Classification Search
CPC ..... G06K 2009/00738; G06K 9/00771; G06K 9/00711; G06Q 10/02; G06Q 10/00;
(Continued)

(56) References Cited

U.S. PATENT DOCUMENTS 8,620,841 B1 * 12/2013 Filson .................... G08B 17/10
706/12
2004/0105006 A1    6/2004 Lazo et al.
(Continued)

FOREIGN PATENT DOCUMENTS

| | | |
|---|---|---|
| JP | 2017-10279 A | 1/2017 |
| JP | 2017-33096 A | 2/2017 |
| WO | 2016/067610 A1 | 5/2016 |

OTHER PUBLICATIONS

International Search Report of PCT/JP2018/023627 dated Sep. 11, 2018 [PCT/ISA/210].
(Continued)

*Primary Examiner* — Zhihan Zhou
(74) *Attorney, Agent, or Firm* — Sughrue Mion, PLLC (57) ABSTRACT

A computer-implemented method for determining whether or not an event is going to aggravate using a sensor operationally coupled to a processor is disclosed. The method includes receiving, from the sensor, event information identifying a type of the event and location information identifying a location at which the event is occurring, collecting, from the sensor, information around the location in response to the location information, analyzing, at the processor, the information around the location, and determining whether or not the event is going to aggravate, at the processor, based on a result of the analysis.

17 Claims, 5 Drawing Sheets

(51) Int. Cl.
    *H04W 4/90*     (2018.01)
    *G08B 21/10*     (2006.01)
    *G08B 31/00*     (2006.01)
    *H04N 7/18*     (2006.01)
    *H04W 4/021*     (2018.01)

(52) U.S. Cl.
    CPC ............ *G08B 31/00* (2013.01); *H04N 7/181* (2013.01); *H04W 4/021* (2013.01); *H04W 4/90* (2018.02); *G06K 2009/00738* (2013.01)

(58) Field of Classification Search
    CPC ........ G06Q 10/04; G06Q 10/08; G06Q 10/06; G08B 21/10; G08B 31/00; H04W 4/90; H04W 4/021; H04N 7/181
    See application file for complete search history.

(56) References Cited

U.S. PATENT DOCUMENTS

| | | | | |
|---|---|---|---|---|
| 2007/0279214 | A1* | 12/2007 | Buehler | G08B 13/19645 340/521 |
| 2008/0297599 | A1* | 12/2008 | Donovan | G11B 27/329 348/143 |
| 2013/0335415 | A1* | 12/2013 | Chang | G06T 17/05 345/420 |
| 2014/0266690 | A1* | 9/2014 | McKinley | G08B 25/006 340/539.11 |
| 2014/0368643 | A1* | 12/2014 | Siegel | G08B 13/19695 348/143 |
| 2015/0078618 | A1* | 3/2015 | Kim | G08B 13/19608 382/103 |
| 2015/0312535 | A1* | 10/2015 | Borger | G08B 25/14 386/228 |
| 2015/0324636 | A1 | 11/2015 | Bentley et al. | |
| 2016/0300252 | A1* | 10/2016 | Frank | G06F 16/24578 |
| 2016/0311401 | A1* | 10/2016 | Altawil | B60R 25/305 |
| 2017/0076570 | A1* | 3/2017 | Pattyn | G08B 25/014 |
| 2017/0237942 | A1* | 8/2017 | Arikuma | H04N 7/18 348/159 |
| 2017/0301220 | A1* | 10/2017 | Jarrell | H04W 4/38 |
| 2018/0082120 | A1* | 3/2018 | Verdejo | G06K 9/00711 |

OTHER PUBLICATIONS

Written Opinion of PCT/JP2018/023627 dated Sep. 11, 2018 [PCT/ISA/237].
Communication dated May 25, 2020, from the European Patent Office in application No. 18827710.7.
Singaporean Office Action for SG Application No. 11202000002T dated Mar. 9, 2021.

* cited by examiner

Fig. 5 ized as "escalating factor" or "mitigating factor". In an example, the

SYSTEM AND METHOD FOR DETERMINING EVENT

CROSS REFERENCE TO RELATED APPLICATIONS

This application is a National Stage of International Application No. PCT/JP2018/023627, filed Jun. 21, 2018, claiming priority to Singapore Patent Application No. 10201705480U, filed Jul. 3, 2017, the disclosure of which is incorporated herein in its entirety by reference.

TECHNICAL FIELD

The invention relates to a surveillance system. More specifically, the invention relates to system and method for determining event.

BACKGROUND ART

Surveillance systems such as video surveillance systems have been used in several areas for routine surveillance and for event detection or determination. Abnormal events such as terrorism, riot, theft, fighting, fire, car accidents, etc. are meant to be captured by such surveillance systems.

Moreover, in some situations, it is difficult for users of such surveillance system, including security officers and police officers, to judge whether an abnormal event will escalate into a serious one because surveillance system basically focuses on the abnormal event itself. For example, a surveillance system incorporating video analytics detects an incident automatically and shows the video footage that includes the detected event. However, it still requires the user to review the video footage so as to determine whether or not the detected event is going to aggravate, e.g. become more serious.

Thus, what is needed is an improved surveillance system that assists the users to determine whether or not the event will escalate into a serious one and to take necessary actions to minimize aggravation of the incident if necessary. Furthermore, other desirable features and characteristics will become apparent from the subsequent detailed description and the appended claims, taken in conjunction with the accompanying drawings and this background of the disclosure.

SUMMARY OF INVENTION

In a first aspect of the present invention, a computer-implemented method for determining whether or not an event is going to aggravate using a sensor operationally coupled to a processor is disclosed. The method includes receiving, from the sensor, event information identifying a type of the event and location information identifying a location at which the event is occurring, collecting, from the sensor, information around the location in response to the location information, analyzing, at the processor, the information around the location, and determining whether or not the event is going to aggravate, at the processor, based on a result of the analysis.

In a second aspect of the present invention, a system for determining whether or not an event is going to aggravate using a sensor operationally coupled to a processor is disclosed. The system includes a receiver for receiving event information identifying a type of the event and location information identifying a location at which the event is occurring, a sensor for collecting information around the location in response to the location information, an analyzer for analyzing the information around the location, and an determining module for determining whether or not the event is going to aggravate, based on a result of the analysis.

In a third aspect of the present invention, a computer system for determining whether or not an event is going to aggravate is disclosed. The computer system includes a memory device for storing data, a display, and at least one processor coupled to the memory device. The at least one processor is configured to receive event information identifying a type of the event and location information identifying a location at which the event is occurring, receive event information identifying a type of an event and location information identifying a location at which the event is occurring, analyze the information around the location, and determine whether or not the event is going to aggravate based on a result of the analysis.

In a fourth aspect of the present invention, a computer program embodied on non-transitory computer readable media for determining whether or not an event is going to aggravate is disclosed. The program includes at least one code segment executable by a computer to instruct the computer to receive event information identifying a type of the event and location information identifying a location at which the event is occurring, receive event information identifying a type of an event and location information identifying a location at which the event is occurring, analyze the information around the location, and determine whether or not the event is going to aggravate based on a result of the analysis.

Unless context dictates otherwise, the following terms will be given the meaning provided here:

The term "event" means an abnormal incident or situation which needs to be monitored by a surveillance system, a command center or a security company. In an example, the term "event" includes a traffic accident or a fighting. In another example, the term "event" includes a fire or natural disasters such as lighting or earthquake.

The term "event aggravation" means that an event becomes worse because of one or more factors surrounding the event. The term "event aggravation" includes a situation that an event becomes worse by itself. In an example of "event aggravation", a quarrel becomes a fighting and then becomes a riot. In another example of "event aggravation", a small fire becomes a big fire resulting in many casualties. That is, "event aggravation" is a situation in which an event escalates into a more serious one based on a relationship between the event and the situation around the event.

The term "escalating factor" includes people, things or conditions which have a potential to make an event escalate to be worsen. In an example, the term "escalating factor" includes a crowd near a fighting or an explosion. In another example, the term "escalating factor" includes a petrol station near a big fire.

The term "mitigating factor" includes people, things or conditions which have a potential to minimize an escalation of an event. In an example, the term "mitigating factor" includes field officers who work on controlling traffic near a traffic accident. In another example, the term "mitigating factor" includes an expected rain for a big fire.

The term "neutral factor" includes people, things or conditions which do not have any or less impact to an escalation of an event. In other words, the term "neutral factor" includes all factors which are not categorized as "escalating factor" or "mitigating factor". In an example, the term "neutral factor" includes a crowd moving away from the event location.

BRIEF DESCRIPTION OF DRAWINGS

The accompanying figures, where like reference numerals refer to identical or functionally similar elements throughout the separate views and which together with the detailed description below are incorporated in and form part of the specification, serve to illustrate various embodiments and to explain various principles and advantages in accordance with the present embodiment.

Skilled artisans will appreciate that elements in the figures are illustrated for simplicity and clarity and have not necessarily been depicted to scale. For example, the dimensions of some of the elements in the simulation visualization or steps in the flowcharts may be exaggerated in respect to other elements to help improve understanding of the present embodiment.

DESCRIPTION OF EMBODIMENTS

The following detailed description is merely exemplary in nature and is not intended to limit the invention or the application and uses of the invention. Furthermore, there is no intention to be bound by any theory presented in the preceding Background Art of the invention or the following detailed description. It is the intent of the present embodiment to present an improved method for monitoring event related data.

Figure 1:
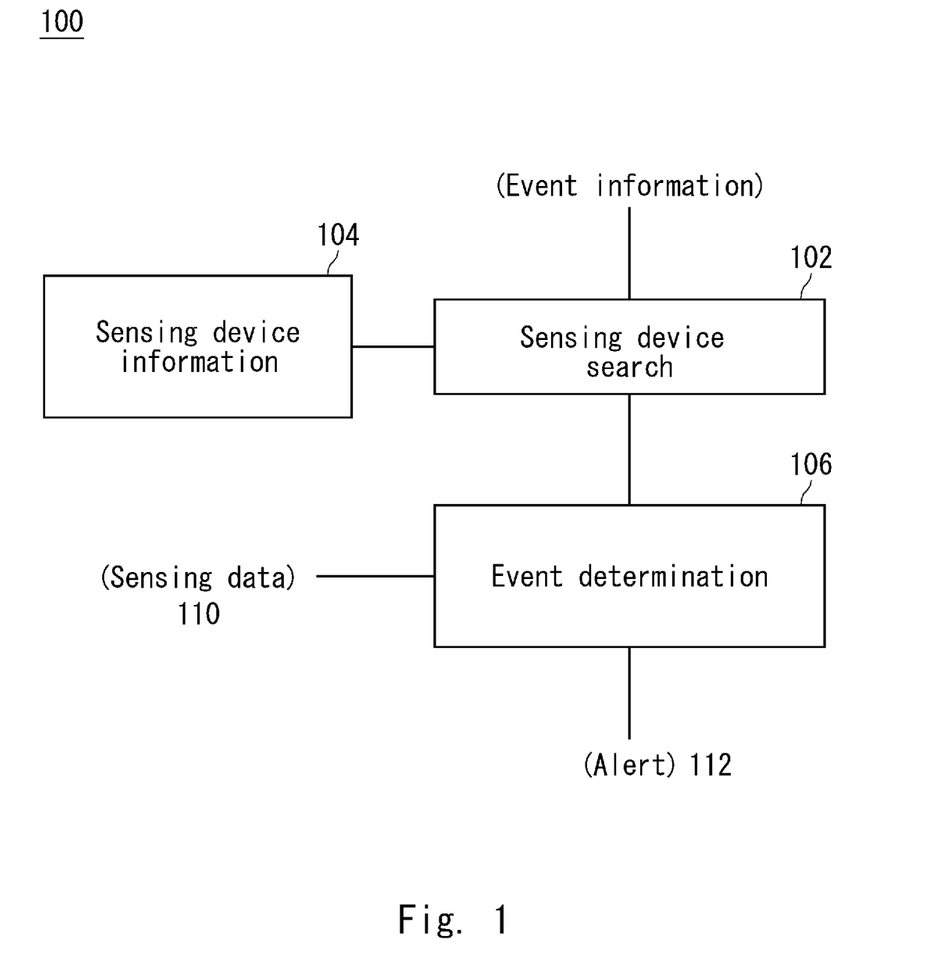
FIG. 1 depicts a block diagram of a system for determining event in accordance with a present embodiment.

FIG. 1 depicts a block diagram of a system 100 for determining whether or not an event is going to aggravate in accordance with a present embodiment. The system 100 includes a sensing device search module 102 (or a receiver). The sensing device search module 102 receives event information 108 identifying a type of event and location information identifying a location at which the event is occurring. Based on the location information, the sensing device search module 102 selects one or more information source near the location at which the event is occurring. The selection of the information sources may be user-defined. Additionally or alternatively, the selection of information sources may be one that enables a more accurate analysis of the information. The information source may include a sensing device such as surveillance camera and microphone which can collect information near the location at which the event is occurring. The information source may further include internet for example, keyword search results or geolocation search results in social network specifying the location at which the event is occurring.

In one example, location of each sensing device and type of each sensing device (or a sensor) such as surveillance camera and microphone may be stored in a memory 104 coupled to the sensing device search module 102 so that the sensing device search module 102 selects one or more sensing devices based on the location information at which the event is occurring. This may be at the outset of the event. Additionally or alternatively, sensation of the sensing device may be during the occurrence of the event.

Once the one or more sensing devices are selected, sensing data 110 around the location at which the event is occurring is collected and analyzed at an event determination module 106 (or an analyzer). The event determination module 106 receives sensing data 110 (e.g. video footage, sound data, social media data) corresponding to the sensors selected by the sensing device search module 102.

The event determination module 106 determines whether the event will escalate into a more serious one or become aggravated based on a relationship between the event itself and the situation around the event. There may be a look-up table that illustrates the relationship between the event and situation around the event. The event determination module 106 further categorizes information around the event location into escalating factor, neutral factor, mitigating factor in view of potential impact to the event.

If there is a crowd surrounding the event and the crowd is approaching to the location of the event, the crowd has a potential to escalate the event into a more serious one or aggravate. Thus, this situation is considered as an escalating factor. On the other hand, if the surrounding crowd does not move or move away from the location of the event, the situation is considered as a neutral factor.

If the size of the surrounding crowd is getting larger, such crowd has a potential to escalate the event into a more serious one or become aggravated. Thus, this situation is also considered as an escalating factor. These crowds may be analyzed by video analytics. The video analytics may be used to analyze the crowd, more specifically, estimating the crowd size (the number of people), flow (movement toward event location or not), mood (noisy or quiet in view of acoustic analysis), age and gender. The video analytics may also be used to analyze the surrounding traffic situation by estimating the number of vehicle and the flow of vehicles.

Additionally or alternatively acoustic analytics may be used to determine an event and minimize an event aggravation. Acoustic analytics that analyze environmental sound captured by microphone may be used to analyze language, age, gender, mood (e.g. shouting). Acoustic analytics may also be used to estimate the surrounding traffic situation based on noises caused by vehicles. If the surrounding noise level is increasing and approaching to the location of the incident, this situation is considered as an escalating factor. If various languages are detected from the crowd, the situation may not be so serious because the crowd has low possibility to unite each other. However, if only one language is detected from the crowd, the situation may be considered as an escalating factor which has a potential to make the event escalate into serious one. If the mood of the surrounding crowd is getting aggressive in view of acoustic analytics or any other analytics, for example a loud shouting is detected from the surrounding crowd, this situation is considered as an escalating factor.

If event determination module 106 determines that the event will escalate into a more serious one or become aggravated, an alert 112 may be sent to command center or security companies to take an action for minimizing the event aggravation. Additionally or alternatively, a recommendation of resource allocation to minimize the event aggravation is provided to the command center or security companies to facilitate their decision making.

Figure 2:
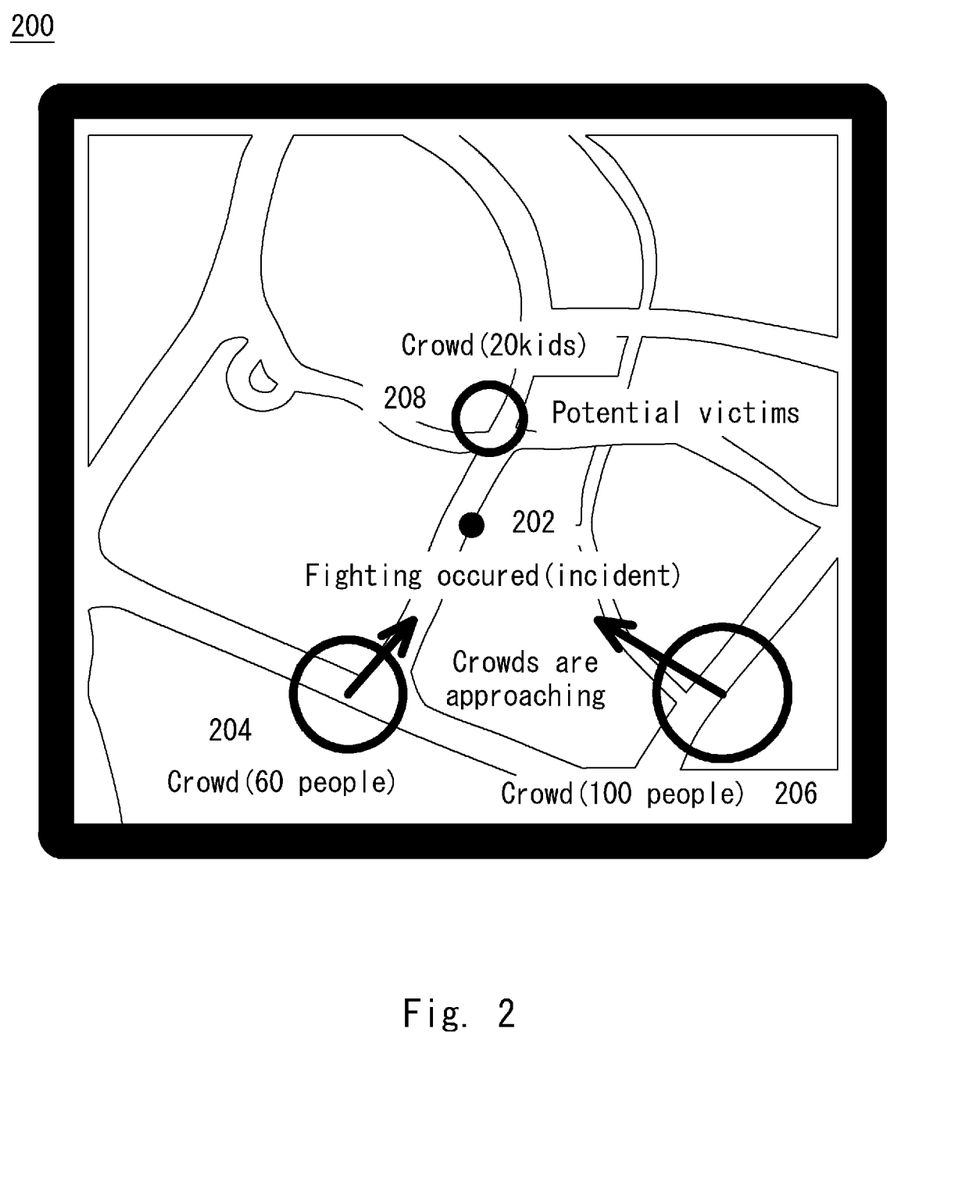
FIG. 2 depicts a display showing an example of information around location at which an event is occurring in accordance with a present embodiment.

FIG. 2 depicts a display 200 showing an example of information around location at which an event is occurring in accordance with a present embodiment. In an example, an event 202 is detected and a type of event is considered as fighting. Based on location of the event 202, cameras and microphones near the location at which the event 202 is occurring are identified. Video footages and acoustic data from identified cameras and microphones are gathered and analyzed in a system according to the present embodiment. Based on location of the event 202, keyword search results and geolocation search results in social media may be also gathered and analyzed in the system according to the present embodiment. The information surrounding the location at which the event is occurring may also be received from callers or field officers who are making emergency call from the event location to call a police or an ambulance.

In an example, the surrounding information is analyzed as three crowds 204, 206 and 208. The crowd 204 is analyzed as a size of crowd with approximately 60 people and the crowd 204 is approaching to the location at which the event is occurring. The crowd 206 is analyzed as a size of crowd with approximately 100 people and the crowd 206 is approaching to the location at which the event is occurring. These crowds may hear shouting during the fighting and they may be heading in the direction at which the fighting is occurring. The system according to the present embodiment may consider these crowds as escalating factors which have potentials to escalate the event to be more serious one.

The crowd 208 is analyzed as a size of crowd with approximately 20 people. Based on video analysis and acoustic analysis, the crowd 208 is analyzed to be including many kids who may be considered as potential victims. In an example, a number of subjects, who are affected by the event, are displayed on the display 200. The examples of subjects include, among other, young children, so that prioritizing protection of such crowds is facilitated. Thus, the crowd 208 is also considered as an escalating factor to the event. On the other hands, if there are field officers who are attending to the event or controlling traffic situations near the event, these field officers may be considered as mitigating factors which are mitigating the potential event aggravation. Since heavy traffic jam has a potential to escalate the event to be aggravated, field officers who are minimizing heavy traffic jam are indirectly contributing to minimize the event aggravation.

Figure 3:
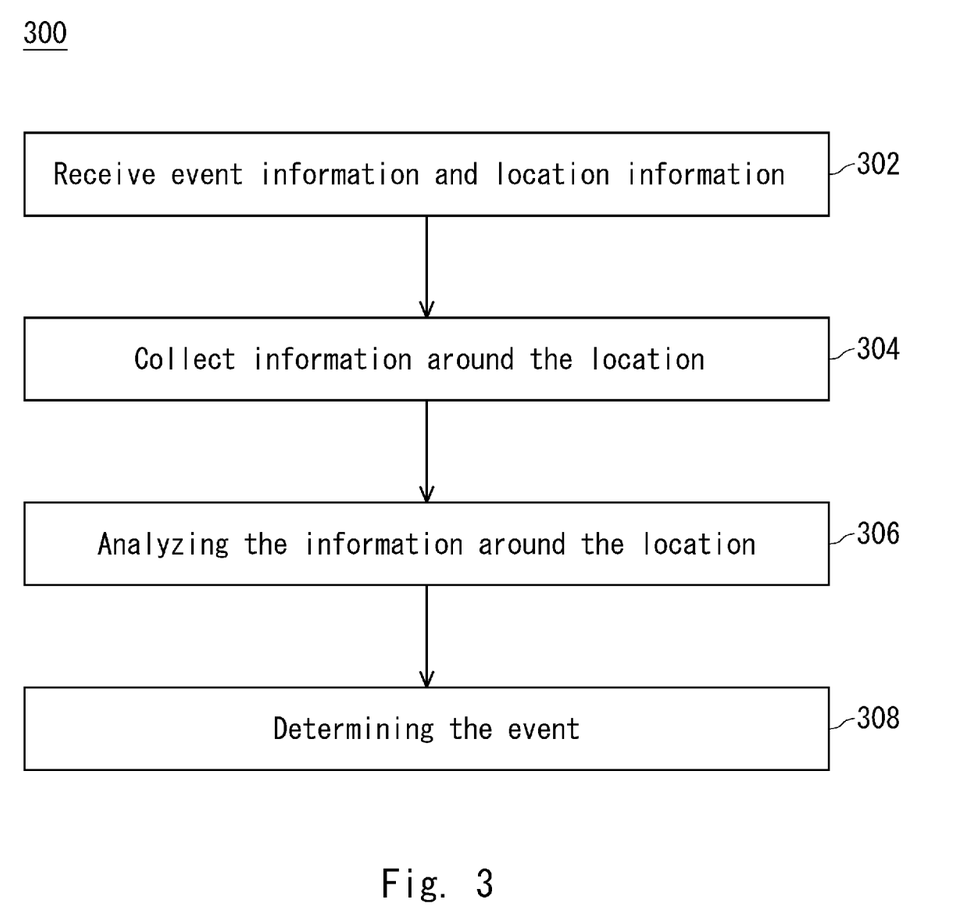
FIG. 3 illustrates a flowchart of a method for determining event in accordance with a present embodiment.

FIG. 3 depicts a flowchart 300 of a method for determining whether or not an event is going to aggravate in accordance with a present embodiment. In step 302, an event is detected or determined and event information such as a type of the event and location information such as geographical location at which the event is occurring is received by the system in accordance with the present embodiment. For various embodiments below, it is to be understood that detection of an event refers to determination that the event has occurred once it takes place. The detection of the event may be conducted by surveillance cameras at the event location or emergency call from the event location.

In step 304, information around the event location is collected. One of more information source such as video footage, acoustic data, social media information, traffic information and weather information, around the event location are selected in view of the type of the event. In one example, all information near the event location is collected and selection of the information is conducted during analysis in step 306. Alternatively, a specific device has already been selected and a request is sent to the specific device such as surveillance camera, microphone near the event location and information is retrieved from the specific device. Information with regard to location and coverage of each device may be available for the system so that the system can select the specific device to retrieve information.

In step 306, the collected information around the location is analyzed. The collected information is analyzed to determine the possibility of event aggravation. The collected information is categorized into escalating factor, neutral factor and mitigating factor in light of potential impact to the event. Each factor especially escalating factor may be rated in light of potential impact to the event. If crowd is approaching to the event location, the escalating factor may be rated as high. However, if distance between crowd and the event location is sufficiently far and the crowd is stable, it may be considered as neutral factor.

In step 308, whether or not the event is going to aggravate is determined based on the results of the analysis. The escalating factor and mitigating factor may be mapped around the location and visualized so that security surveillance company or command center can understand factors which may affect the event in the future. In one example, the escalating factor and mitigating factors are symbolized as a relevant pictorial symbols or colors are overlaid on a geographical map. Even if traffic accident was occurred near the event, field officers attending to the traffic accident may neutralize the escalating factor and immediate attention may not be required. The escalating factors may alert the security surveillance company or command center to inform that more field officers are required near the event location.

Figure 4:
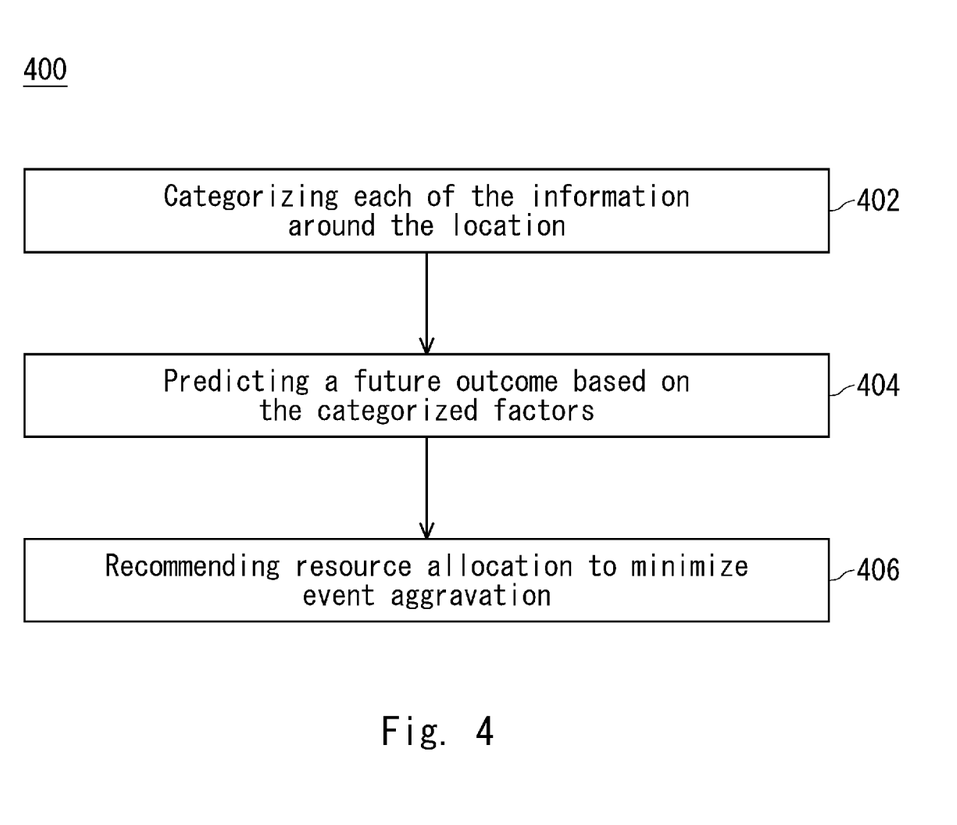
FIG. 4 depicts a flowchart of a method of analyzing information around location at which an event is occurring in accordance with a present embodiment.

FIG. 4 depicts a flowchart 400 of a method of analyzing information around location at which an event is occurring in accordance with a present embodiment, which corresponds to step 306 of FIG. 3.

In step 402, each of the information around the location is categorized into escalating factor, neutral factor and mitigating factor to the event. These factors may change as time proceeds. If crowd is approaching to the event location, the crowd may be considered as neutral factor at first and then changed to escalating factor. If a train cannot depart from a station due to an accident at the other station, a crowd at the station may be an escalating factor. However, once the train comes and goes as planned and no crowd is found at the station, the crowd is no longer the escalating factor.

In step 404, a future outcome is predicted based on the categorized factors. Each of the categorized factors may be mapped and visually presented to viewers e.g. command officers in command center. The map with categorized factors may be visualized with time frame so that past situation, current situation and predicted future situation will be understandable for the viewers. What happened at the time of event and what will be happed in the future if no action is taken will be visualized on map.

In step 406, a resource allocation to minimize event aggravation is recommended. Based on past situation, current situation and predicted future situation and available resource, the recommendation for resource allocation to minimize event aggravation may be provided together with simulated future situation in light of the recommended resource allocation. Several options for resource allocation together with simulated outcome are provided so that command center can decide how to allocate field offices to minimize the event aggravation.

Figure 5:
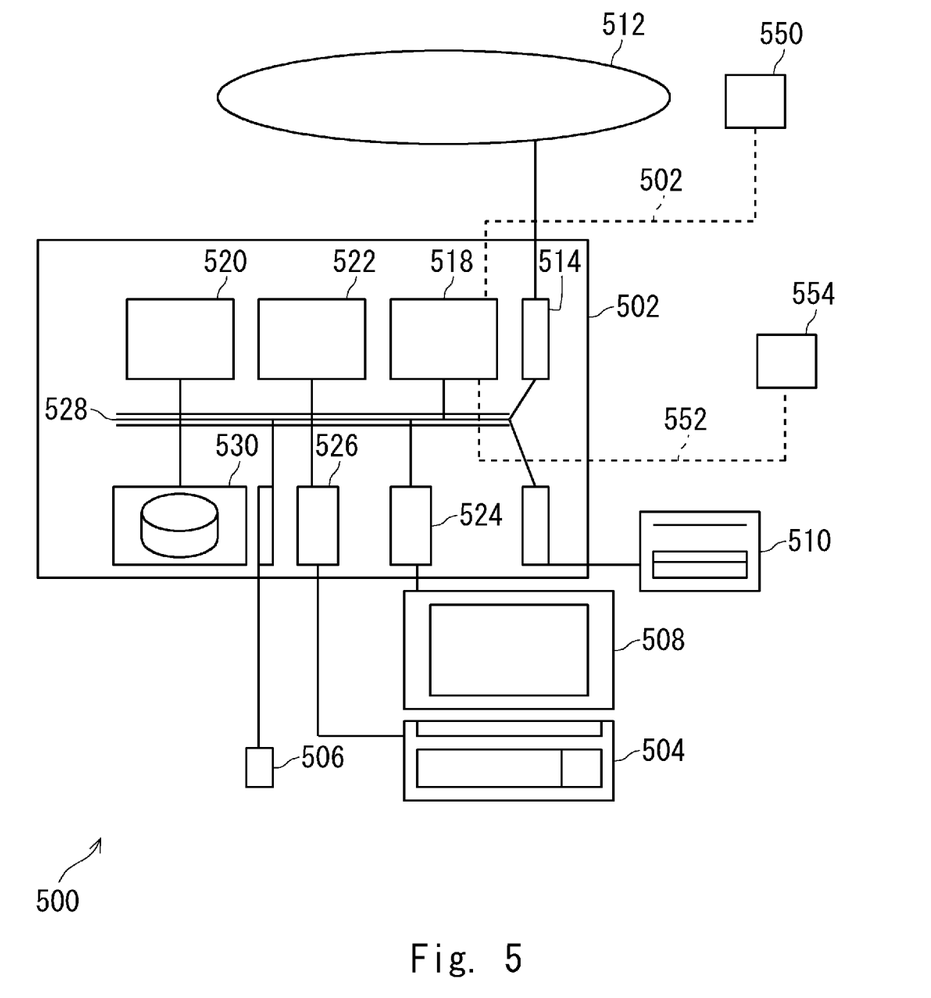
FIG. 5 depicts a computer system for determining event in accordance with a present embodiment.

The method and system of the described example embodiments can be implemented on a computer system 500, schematically shown in FIG. 5. It may be implemented as software, such as a computer program being executed within the computer system 500, and instructing the computer system 500 to conduct the method of the example embodiments.

Some portions of the description which follows are explicitly or implicitly presented in terms of algorithms and functional or symbolic representations of operations on data within a computer memory. These algorithmic descriptions and functional or symbolic representations are the means used by those skilled in the data processing arts to convey most effectively the substance of their work to others skilled in the art. An algorithm is here, and generally, conceived to be a self-consistent sequence of steps leading to a desired result. The steps are those requiring physical manipulations of physical quantities, such as electrical, magnetic or optical signals capable of being stored, transferred, combined, compared, and otherwise manipulated.

Unless specifically stated otherwise, and as apparent from the following, it will be appreciated that throughout the present specification, discussions utilizing terms such as "receiving", "collecting", "analyzing", "determining", "categorizing", "predicting", or the like, refer to the action and processes of a computer system, or similar electronic device, that manipulates and transforms data represented as physical quantities within the computer system into other data similarly represented as physical quantities within the computer system or other information storage, transmission or display devices.

The present specification also discloses apparatus for performing the operations of the methods. Such apparatus may be specially constructed for the required purposes, or may comprise a general purpose computer or other device selectively activated or reconfigured by a computer program stored in the computer. The algorithms and displays presented herein are not inherently related to any particular computer or other apparatus. Various general purpose machines may be used with programs in accordance with the teachings herein. Alternatively, the construction of more specialized apparatus to perform the required method steps may be appropriate. The structure of a conventional general purpose computer will appear from the description below.

In addition, the present specification also implicitly discloses a computer program, in that it would be apparent to the person skilled in the art that the individual steps of the method described herein may be put into effect by computer code. The computer program is not intended to be limited to any particular programming language and implementation thereof. It will be appreciated that a variety of programming languages and coding thereof may be used to implement the teachings of the disclosure contained herein. Moreover, the computer program is not intended to be limited to any particular control flow. There are many other variants of the computer program, which can use different control flows without departing from the spirit or scope of the invention.

Furthermore, one or more of the steps of the computer program may be performed in parallel rather than sequentially. Such a computer program may be stored on any computer readable medium. The computer readable medium may include storage devices such as magnetic or optical disks, memory chips, or other storage devices suitable for interfacing with a general purpose computer. The computer readable medium may also include a hard-wired medium such as exemplified in the Internet system, or wireless medium such as exemplified in the GSM mobile telephone system. The computer program when loaded and executed on such a general-purpose computer effectively results in an apparatus that implements the steps of the preferred method.

The computer system 500 comprises a computer module 502, input modules such as a keyboard 504 and mouse 506 and a plurality of output devices such as a display 508, and printer 510.

The computer module 502 is connected to a computer network 512 via a suitable transceiver device 514, to enable access to e.g. the Internet or other network systems such as Local Area Network (LAN) or Wide Area Network (WAN).

The computer module 502 in the example includes a processor 518, a Random Access Memory (RAM) 520 and a Read Only Memory (ROM) 522. The computer module 502 also includes a number of Input/Output (I/O) interfaces, for example I/O interface 524 to the display 508, and I/O interface 526 to the keyboard 504.

The components of the computer module 502 typically communicate via an interconnected bus 528 and in a manner known to the person skilled in the relevant art.

The application program is typically supplied to the user of the computer system 500 encoded on a data storage medium such as a CD-ROM or flash memory carrier and read utilising a corresponding data storage medium drive of a data storage device 530. The application program is read and controlled in its execution by the processor 518. Intermediate storage of program data may be accomplished using RAM 520.

The processor 518 may execute a set of instructions that perform the method claimed with respect to FIG. 3. The processor 518 is configured to receive sensor data 110 captured by the sensing devices disclosed with regard to FIG. 1. The processor 518 is configured to analyse the sensor data 102 to determine whether or not an event is going to aggravate. The processor 518 sends out actuation data 552 to one or more actuators 554 so that the one or more actuators 554 can actuate one or more predetermined devices such as an alarm notification system to minimize event aggravation. The one or more predetermined devices 554 are actuated based on the analysis results of the information surrounding the event.

While exemplary embodiments have been presented in the foregoing detailed description of the invention, it should be appreciated that a vast number of variations exist. For example, those skilled in the art will realize from the teachings herein that the present technology may also be applied to any part in the other type of chemical sensors.

It should further be appreciated that the exemplary embodiments are only examples, and are not intended to limit the scope, applicability, operation, or configuration of the invention in any way. Rather, the foregoing detailed description will provide those skilled in the art with a convenient road map for implementing an exemplary embodiment of the invention. It being understood that various changes may be made in the function and arrangement of elements and method of operation described in an exemplary embodiment without departing from the scope of the invention as set forth in the appended claims.

For example, the whole or part of the exemplary embodiments disclosed above can be described as, but not limited to, the following supplementary notes.

(Supplementary Note 1)

A computer-implemented method for determining whether or not an event is going to aggravate using a sensor operationally coupled to a processor, the method comprising:

receiving, from the sensor, event information identifying a type of the event and location information identifying a location at which the event is occurring;

collecting, from the sensor, information around the location in response to the location information;

analyzing, at the processor, the information around the location; and determining whether or not the event is going to aggravate, at the processor, based on a result of the analysis.

(Supplementary Note 2)

The method according to Supplementary note 1, wherein the step of collecting information around the location comprises collecting information from mobile phones, video surveillance systems and internet.

(Supplementary Note 3)

The method according to Supplementary note 1, wherein the step of analyzing the information comprises categorizing each of the information around the location into an escalating factor, a neutral factor or a mitigating factor to the event aggravation in view of the type of the event; and predicting a future outcome based on the categorized factors.

(Supplementary Note 4)

The method according to Supplementary note 1, wherein the step of analyzing, at the processor, the information around the location comprising analyzing the information using a video analytics and acoustic analytics.

(Supplementary Note 5)

The method according to Supplementary note 4, wherein the step of analyzing, at the processor, the information around the location further comprises identifying information relating to at least one party around the location.

(Supplementary Note 6)

The method according to Supplementary note 4, wherein the step of analyzing, at the processor, the information around the location further comprises identifying a traffic situation surrounding the location of the event.

(Supplementary Note 7)

The method according to Supplementary note 5, wherein the information that is identified includes demographic information and location information of the at least one party.

(Supplementary Note 8)

The method according to Supplementary note 1, further comprising sending an alert based on the results of analysis.

(Supplementary Note 9)

The method according to Supplementary note 1, further comprising displaying, on a display, the determined event.

(Supplementary Note 10)

The method according to Supplementary note 9, wherein the step of displaying the determined event comprises displaying a number of subjects who are affected by the event.

(Supplementary Note 11)

A system for determining whether or not an event is going to aggravate using a sensor operationally coupled to a processor, the system comprising:

a receiver for receiving event information identifying a type of the event and location information identifying a location at which the event is occurring;

a sensor for collecting information around the location in response to the location information;

an analyzer for analyzing the information around the location; and a determining module for determining whether or not the event is going to aggravate, based on a result of the analysis.

(Supplementary Note 12)

The system according to Supplementary note 11, wherein the information around the location is collected from mobile phones, video surveillance systems and internet.

(Supplementary Note 13)

The system according to Supplementary note 11, wherein the analyzer comprises a categorizing module for categorizing each of the information around the location into an escalating factor, a neutral factor or a mitigating factor to the event aggravation in view of the type of the event; and wherein the analyzer further predicts a future outcome based on the categorized factors.

(Supplementary Note 14)

The system according to Supplementary note 11, the analyzer further analyzes the information around the location using a video analytics and acoustic analytics.

(Supplementary Note 15)

The system according to Supplementary note 14, wherein the analyzer comprises an identifier for identifying crowd information including at least one of size, flow, mood, age and gender.

(Supplementary Note 16)

The system according to Supplementary note 14, wherein the analyzer comprises an identifier for identifying a traffic situation surrounding the location of the event.

(Supplementary Note 17)

The system according to Supplementary note 14, wherein the analyzer comprises an identifier for identifying location and status of potential victims to be protected.

(Supplementary Note 18)

The system according to Supplementary note 11, further comprising an alerting module for alerting based on the results of analysis.

(Supplementary Note 19)

The system according to Supplementary note 11, further comprising a display for displaying the determined event.

(Supplementary Note 20)

The system according to Supplementary note 11, wherein the display displays a number of subjects who are affected by the event.

(Supplementary Note 21)

A computer system for determining whether or not an event is going to aggravate, the computer system comprising:

a memory device for storing data;

a display; and at least one processor coupled to the memory device and being configured to:

receive event information identifying a type of the event and location information identifying a location at which the event is occurring;

collect information around the location in response to the location information;

analyze the information around the location; and determine whether or not the event is going to aggravate based on a result of the analysis.

(Supplementary Note 22)

A computer program embodied on non-transitory computer readable media for determining whether or not an event is going to aggravate, the program comprising at least one code segment executable by a computer to instruct the computer to:

receive event information identifying a type of the event and location information identifying a location at which the event is occurring;

collect information around the location in response to the location information;

analyze the information around the location; and determine whether or not the event is going to aggravate based on a result of the analysis.

REFERENCE SIGNS LIST

100 System
102 Sensing device search module
104 Memory
106 Event determination module

The invention claimed is:

1. A computer-implemented method for determining whether or not an event is going to aggravate using a sensor operationally coupled to a processor, the method comprising:
receiving, from the sensor, event information identifying a type of the event and location information identifying a location at which the event is occurring;
collecting, from the sensor, information around the location in response to the location information;
analyzing, at the processor, the information around the location; and
determining whether or not the event is going to aggravate, at the processor, based on a result of the analysis,
wherein analyzing the information comprises:
identifying, based on the information around the location, crowd information related to a crowd around the location, wherein the crowd information includes size of the crowd, flow of the crowd, mood of the crowd, age of people in the crowd, gender of people in the crowd, a language used by the crowd and a number of the language used by the crowd;
categorizing, based on at least one of people, things and sound included in each of the information around the location, and the crowd information, each of the information around the location into an escalating factor, a neutral factor or a mitigating factor to the event aggravation in view of the type of the event;
categorizing, when only one language is detected from the crowd, information around the location at which the event is occurring into the escalating factor; and
predicting a future outcome based on the categorized factors.

2. The method according to claim 1, wherein collecting information around the location comprises collecting information from mobile phones, video surveillance systems and internet.

3. The method according to claim 1, wherein analyzing, at the processor, the information around the location comprises analyzing the information using a video analytics and acoustic analytics.

4. The method according to claim 3, wherein analyzing, at the processor, the information around the location further comprises identifying information relating to at least one party around the location.

5. The method according to claim 3, wherein analyzing, at the processor, the information around the location further comprises identifying a traffic situation surrounding the location of the event.

6. The method according to claim 4, wherein the information that is identified includes demographic information and location information of the at least one party.

7. The method according to claim 1, further comprising sending an alert based on the results of analysis.

8. The method according to claim 1, further comprising displaying, on a display, the determined event.

9. The method according to claim 8, wherein displaying the determined event comprises displaying a number of subjects who are affected by the event.

10. A system for determining whether or not an event is going to aggravate using a sensor operationally coupled to a processor, the system comprising:
a receiver configured to receive event information identifying a type of the event and location information identifying a location at which the event is occurring;
a sensor configured to collect information around the location in response to the location information;
an analyzer configured to analyze the information around the location; and
a determining module configured to determine whether or not the event is going to aggravate, based on a result of the analysis,
wherein the analyzer comprises an identifier configured to identify, based on the information around the location, crowd information related to a crowd around the location, wherein the crowd information includes size of the crowd, flow of the crowd, mood of the crowd, age of people in the crowd, gender of people in the crowd, a language used by the crowd and a number of the language used by the crowd,
wherein the analyzer comprises a categorizing module configured to categorize, based on at least one of people, things and sound included in each of the information around the location, and the crowd information, each of the information around the location into an escalating factor, a neutral factor or a mitigating factor to the event aggravation in view of the type of the event;
wherein the categorizing module is further configured to categorize, when only one language is detected from the crowd, information around the location at which the event is occurring into the escalating factor, and
wherein the analyzer predicts a future outcome based on the categorized factors.

11. The system according to claim 10, wherein the information around the location is collected from mobile phones, video surveillance systems and internet.

12. The system according to claim 10, wherein the analyzer further analyzes the information around the location using a video analytics and acoustic analytics.

13. The system according to claim 12, wherein the analyzer comprises an identifier configured to identify a traffic situation surrounding the location of the event.

14. The system according to claim 12, wherein the analyzer comprises an identifier configured to identify location and status of potential victims to be protected.

15. The system according to claim 10, further comprising an alerting module configured to alert based on the results of analysis.

16. The system according to claim 10, further comprising a display configured to display—the determined event.

17. A computer system for determining whether or not an event is going to aggravate, the computer system comprising:
a memory device for storing data;
a display; and
at least one processor coupled to the memory device and being configured to:
receive event information identifying a type of the event and location information identifying a location at which the event is occurring;
collect information around the location in response to the location information;
analyze the information around the location; and
determine whether or not the event is going to aggravate based on a result of the analysis,
wherein the at least one processor is further configured to:
identify, based on the information around the location, crowd information related to a crowd around the location, wherein the crowd information includes size of the crowd, flow of the crowd, mood of the crowd, age of people in the crowd, gender of people in the crowd, a language used by the crowd and a number of the language used by the crowd;

categorize, based on at least one of people, things and sound included in each of the information around the location, and the crowd information, each of the information around the location into an escalating factor, a neutral factor or a mitigating factor to the event aggravation in view of the type of the event;

categorizing, when only one language is detected from the crowd, information around the location at which the event is occurring into the escalating factor; and predict a future outcome based on the categorized factors.

* * * * *